March 19, 1929.  W. GEIST  1,706,354
BELT END CONNECTER
Filed March 15, 1928
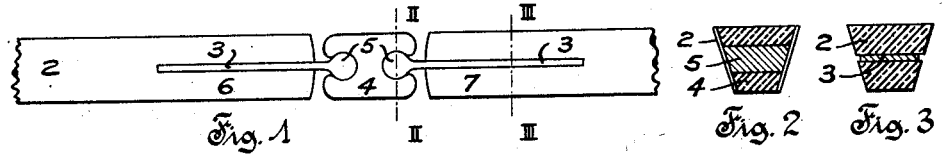
Fig. 1   Fig. 2   Fig. 3
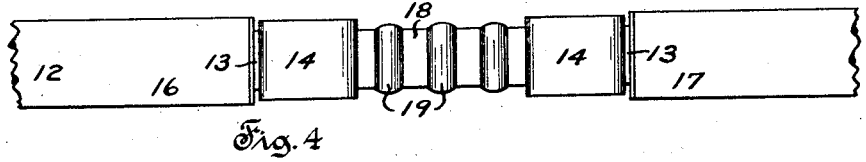
Fig. 4
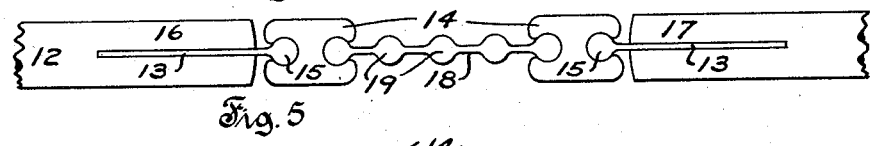
Fig. 5
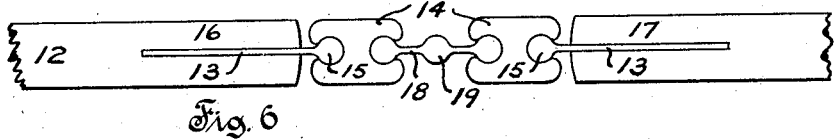
Fig. 6
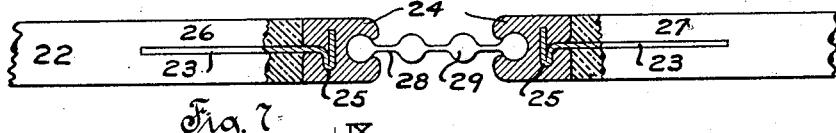
Fig. 7
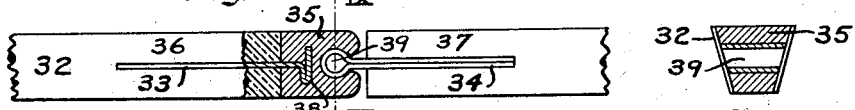
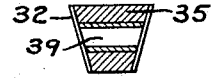
Fig. 8   Fig. 9
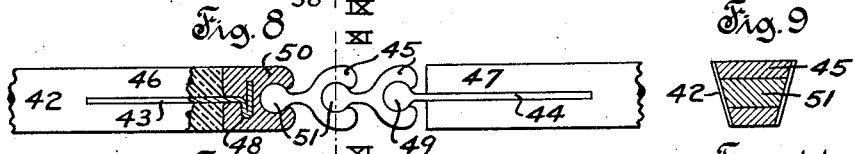
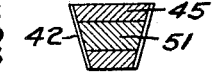
Fig. 10   Fig. 11
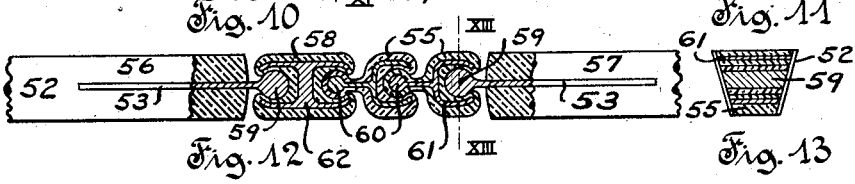
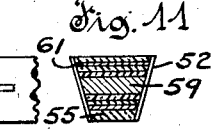
Fig. 12   Fig. 13
Inventor
W. Geist
by
Attorney Patented Mar. 19, 1929.

1,706,354

UNITED STATES PATENT OFFICE.

WALTER GEIST, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

BELT END CONNECTER.

Application filed March 15, 1928. Serial No. 261,794.

The present invention relates in general to improvements in the art of connecting adjacent ends of power transmission belts or the like, in order to provide for continuity thereof.

An object of the invention is to provide a simple and conveniently manipulable connecter for producing a relatively durable union between the adjacent ends of a transmission belt. Another object of the invention is to provide means for effectively connecting the adjacent ends of relatively thick belts, and for permitting rapid disconnection of the belt ends. A further object of the invention is to provide a connecter especially adapted to be applied to trapezoidal belts formed of rubber composition. Still another object of the invention is to provide an effective connecter for belt ends which will not interfere with the normal operation of the belt. These and other objects and advantages will be apparent from the following description.

A clear conception of several embodiments of the invention and of the manner of constructing and of operating connecters built in accordance therewith, may be had by referring to the drawing accompanying and forming a part of this specification in which the various parts are referred to by means of suitable reference characters.

Fig. 1 is a side elevation of the connected end portions of a trapezoidal transmission belt, showing one of the improved connecters applied thereto.

Fig. 2 is a transverse section through the connecting means illustrated in Fig. 1, the section being taken along the line II—II of Fig. 1.

Fig. 3 is another transverse section through the belt end of Fig. 1, the section being taken along the line III—III of Fig. 1.

Fig. 4 is a top view of another form of belt end connecter.

Fig. 5 is a side elevation of the belt end connecter shown in Fig. 4.

Fig. 6 is a side elevation of the belt end connecter of Fig. 5, the connecter having been shortened in accordance with one feature of the improvement.

Fig. 7 is a part sectional side elevation of a modified form of belt end connecter.

Fig. 8 is a part sectional side elevation of still another form of detachable belt end connecter.

Fig. 9 is a transverse section through the connecter of Fig. 8, the section being taken along the line IX—IX.

Fig. 10 is a part sectional side elevation of another modification of the invention.

Fig. 11 is a transverse section through the connecter of Fig. 10, the section being taken along the line XI—XI.

Fig. 12 is a part sectional side elevation of a further modification of the invention.

Fig. 13 is a transverse section through the detachable connecter of Fig. 12, the section being taken along the line XIII—XIII.

Referring to Figs. 1, 2 and 3, the power transmission belt 2 is of trapezoidal transverse cross section, being provided with oppositely disposed relatively inclined side driving surfaces, and is preferably formed of elastic material such as rubber composition. The adjacent belt ends 6, 7 are slitted in the plane of the pitch line, and headed connecting strips or elements 3 are rigidly attached to the belt ends within the slits. The elements 3 may be formed of tough fabric or of metal, and may be firmly attached to the belt ends 6, 7 by vulcanizing, cementing, riveting, or otherwise. Each of the elements 3 is provided with an end head or enlargement 5 and these enlargements are frictionally engageable with opposite end recesses in a connecter 4. The connecter 4 is of less width than the distance between the side driving surfaces of the belt 2, and may be formed either of metal or other suitable material which should preferably be coated with rubber. The connecter 4 may be removed from the enlargements 5 in order to disconnect the belt ends 6, 7, by merely displacing the belt ends sidewise, and may be readily slipped over the enlargements 5 in order to firmly interconnect the belt ends.

Referring specifically to Figs. 4, 5 and 6, the power transmission belt 12 is of trapezoidal transverse cross section, and is provided with oppositely disposed relatively inclined side driving surfaces, the belt being preferably formed of elastic material such as rubber composition. The adjacent ends 16, 17 of the belt 12 are slitted in the plane of the pitch line, and headed connecting strips or elements 13 are firmly attached to the belt ends within the slits. The elements 13 may be formed of tough fabric or of metal, and may be secured to the belt ends 16, 17 in any suitable manner. Each of the elements 13 is provided with an end enlargement 15 which is frictionally engageable with a correspondingly shaped recess in a connecter 14. The opposite end of each of the connecters 14 has a similar recess adapted for frictional engagement either with the element 13 at the opposite end of the belt 12, or with a headed portion 19 of an intermediate connecting strip 18. The strip 18 may be cut to different lengths so that any of the intervening headed portions 19 thereof may be caused to cooperate with the adjacent recesses of the connecters 14, thereby permitting variation in the length of the final belt. The connecters 14 and the connecting strip 18 are preferably formed of less width than the distance between the side driving surfaces of the belt 12, and may be formed either of metal or other suitable material and coated with rubber. The connecters 14 or the strip 18 may be readily removed from the enlargements 15 of the belt ends 16, 17, in order to disconnect these ends, by merely displacing any one of the elements laterally, and may also be conveniently assembled to provide for continuity in the belt, in an obvious manner.

Referring to Fig. 7, the power transmission belt 22 may likewise be of trapezoidal transverse section and provided with oppositely disposed relatively inclined side driving surfaces, as in the previous disclosures. The belt may be formed of elastic material, and has adjacent ends 26, 27 which are slitted, preferably in the plane of the pitch line. The headed connecting strips or elements 23 secured within the end slits of the belt 22, have enlargements 25 which are embedded in special end pieces 24 each of which is provided with an end recess. The pieces 24 are interconnected by means of a connecting strip 28 having enlargements 29 which frictionally engage the end recesses of the pieces 24. The end pieces 24 and the connecting strip 28 may be formed of metal or other suitable material and coated with rubber, and the connecting strip 28 may be cut to any desirable length thereby permitting variation in the length of the assembled belt structure. The mode of applying and removing the connecting strip 28 to disconnect and to unite the belt ends, will be readily apparent from the disclosure.

In the embodiment of the invention illustrated in Fig. 8, the V-belt 32 has its opposite ends slitted as in the previous embodiments. The belt end 36 is provided with a connecting strip or element 33 attached thereto within the slit, the element 33 being provided with an enlargement 38 which is embedded in an end piece 35. The end piece 35 is provided with a recess formed to receive and to frictionally engage an enlargement 39 formed on a connecting element 34 which is secured within the slit of the other belt end 37. The element 34 may be formed of any suitable material and a solid pin may be inserted within the enlargement 39 of the strip. The various elements may be formed of suitable material and the mode of connecting and disconnecting the belt ends will be readily apparent from the disclosure.

Referring to the embodiment of the invention illustrated in Figs. 10 and 11, the end 46 of the belt 42 is provided with a slit within which a connecting strip or element 43 is secured. The connecting element 43 has an end enlargement 48 which is embedded in a connecting piece 50. The opposite end 47 of the belt 42 is likewise slitted having a connecting strip or element 44 secured within the slit thereof. Any desired number of intermediate connecters 45 having end enlargements 51 and recesses in the opposite ends thereof, may be assembled to provide a union between the belt ends 46, 47, as shown. The end enlargement 49 of the connecting element 44 is cooperable with the end recess of one of the connecters 45, and the end enlargement 51 of the opposite connecter 45 is cooperable with the end recess of the connecting piece 50. As set forth in connection with the previous disclosures, the various elements of the embodiment of Figs. 10 and 11 may be formed of suitable material and coated with rubber, being capable of assemblage and disconnection in an obvious manner.

Referring specifically to the embodiment of the invention illustrated in Figs. 12 and 13, the opposite ends 56, 57 of the belt 42 are slitted and have connecting strips or elements 53 secured within the slits thereof. Each of the elements 53 has an enlarged head 59 adapted for cooperation with an end recess of either a connecter 58 or a connecter 55. The connecter 58 has opposite end recesses while the connecters 55 have a recess at one end thereof and an enlargement 60 at the opposite end thereof. The connecters 58, 55 may be provided with internal reinforcing elements 62, 61 respectively, and may have relatively thick coatings of elastic material as shown. The connecters 58, 55 are preferably of less width than the belt 52 measured between the side driving surfaces thereof, and may be assembled and dismantled in an obvious manner.

From the foregoing description of the various embodiments of the present invention, it will be apparent that in each of these embodiments an effective connecter for detachably uniting the adjacent ends of a V-belt, is provided. In some of the embodiments the length of the connection may be readily varied in order to vary the total length of the belt structure. By forming the connecters of less width than the belt, normal functioning of the side driving surfaces is not interfered with. By coating the connecters with elastic material such as rubber composition, better driving coaction is insured and objectionable noise is also eliminated. Due to the location of the connecting strips in the plane of the pitch line, the normal bending of the belt is not affected by the use of the connecters, and the structure obviously permits connection and disconnection of the belt ends at will without the use of tools. The recessed portions of the connecters must be reinforced sufficiently to prevent spreading of the recess walls when tension is applied to the belt, and this may be accomplished in the manner illustrated in Fig. 12.

It should be understood that it is not desired to limit the invention to the exact details of construction and operation herein shown and described for various modifications within the scope of the claims may occur to persons skilled in the art.

It is claimed and desired to secure by Letters Patent:

1. In combination, a transmission belt having opposite side driving surfaces, and a removable connecter for uniting adjacent ends of said belt, said belt ends and said connecter being formed with a frictionally engageable recess and projection extending across the belt transversely of said surfaces and being adapted for complete removal of said connecter by relative displacement of the belt ends laterally of the pitch line.

2. In combination, a transmission belt having opposite side driving surfaces, and a removable connecter of variable length for uniting adjacent ends of said belt, said belt ends and said connecter being formed with a frictionally engageable recess and projection extending across the belt transversely of said surfaces and being adapted for complete removal of said connecter by relative displacement of the belt ends laterally of said surfaces.

3. In combination, a transmission belt having opposite side driving surfaces, and a removable connecter of less width than the distance between said surfaces for uniting adjacent ends of said belt, said belt ends and said connecter being formed with frictionally engageable recesses and projections extending across the belt transversely of said surfaces and being adapted for detachment and complete removal of said connecter by relative displacement of the belt ends laterally of the pitch line.

4. In combination, a transmission belt having opposite side driving surfaces, and a removable connecter of variable length and of less width than the distance between said surfaces for uniting adjacent ends of said belt, said belt ends and said connecter being formed with frictionally engageable recesses and projections extending across the belt transversely of said surfaces and being adapted for complete removal of said connecter by relative displacement of the belt ends laterally of said surfaces.

5. In combination, a transmission belt formed of elastic material and having opposite side driving surfaces, and a removable connecter covered with elastic material for uniting adjacent ends of said belt, said belt ends and said connecter being formed with frictionally engageable recesses and projections extending across the belt transversely of said surfaces and being adapted for detachment by relative displacement of the belt ends laterally of the pitch line.

6. In combination, a transmission belt formed of rubber composition and having opposite elastic side driving surfaces, and a removable connecter covered with rubber composition and of less width than the distance between said surfaces for uniting adjacent ends of said belt, said belt ends and said connecter being formed with frictionally engageable recesses and projections extending across the belt transversely of said surfaces and adapted for detachment by relative displacement of the belt ends laterally of said surfaces.

7. In combination, a transmission belt formed of elastic material and having opposite relatively inclined side driving surfaces, and a removable connecter of less width than the distance between said surfaces and of variable length for uniting adjacent ends of said belt, said belt ends and said connecter being formed with frictionally interlockable recesses and projections extending across the belt transversely of said surfaces and said connecter being coated with rubber at the sides thereof.

8. In combination, a transmission belt having opposite side driving surfaces, an element secured within an end of said belt in the plane of the pitch line thereoef and extending beyond the belt end, and a removable connecter for uniting the projecting end of said element with the opposite end of said belt, said element and said connecter being formed with frictionally interlockable parts extending across the belt transversely of said surfaces and said parts being formed for detachment and complete removal of said connecter by relative displacement of the belt ends laterally of said surfaces.

In testimony whereof, the signature of the inventor is affixed hereto.

WALTER GEIST.